United States Patent
Schmit et al.

(10) Patent No.: US 10,706,631 B2
(45) Date of Patent: Jul. 7, 2020

(54) IMAGE GENERATION BASED ON BRAIN ACTIVITY MONITORING

(71) Applicant: Advanced Micro Devices, Inc., Santa Clara, CA (US)

(72) Inventors: Michael L. Schmit, Santa Clara, CA (US); Nathaniel David Naegle, Santa Clara, CA (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 58 days.

(21) Appl. No.: 16/176,578

(22) Filed: Oct. 31, 2018

(65) Prior Publication Data

US 2020/0167999 A1    May 28, 2020

(51) Int. Cl.
*G06T 19/00* (2011.01)
*G06F 3/01* (2006.01)

(52) U.S. Cl.
CPC .......... *G06T 19/006* (2013.01); *G06F 3/015* (2013.01); *G09G 2340/0407* (2013.01)

(58) Field of Classification Search
CPC .............. G06T 19/006; G06F 3/015; G09G 2340/0407
See application file for complete search history.

(56) References Cited

U.S. PATENT DOCUMENTS

| 10,417,784 | B1 * | 9/2019 | Cavin | G02B 27/017 |
| 2016/0077547 | A1 * | 3/2016 | Aimone | G06F 3/012 |
| | | | | 345/8 |
| 2016/0210503 | A1 * | 7/2016 | Yin | G06F 3/00 |
| 2018/0096517 | A1 * | 4/2018 | Mallinson | G06T 15/20 |

(Continued)

FOREIGN PATENT DOCUMENTS

| KR | 20130015488 A | * | 2/2013 | |
| KR | 101660634 B1 | * | 9/2016 | |
| WO | WO-2019154511 A1 | * | 8/2019 | G06F 3/0304 |

OTHER PUBLICATIONS

Shumeet Baluja and Dean Pomerleau, Non-Intrusive Gaze Tracking Using Artificial Neural Networks, Nov. 1993, Proceedings of the 6th International Conference on Neural Information Processing Systems, Morgan Kaufmann Publishers Inc., pp. 753-760. (Year: 1993).*

(Continued)

*Primary Examiner* — Jeffery A Brier
(74) *Attorney, Agent, or Firm* — Volpe and Koenig, P.C.

(57) ABSTRACT

Systems, methods, and devices for generating an image frame for display to a user. Brain activity sensor data correlated with movement of a user is received. A predicted field of view of the user is determined based on the brain activity sensor data. An image frame is generated based on the predicted field of view. The image frame is transmitted to a display for display to a user. Some implementations provide for receiving and displaying a foveated image frame based on a predicted field of view of a user. Brain activity information of a user is captured. The brain activity information is communicated to a transceiver. The brain activity information is transmitted to a rendering device using the transceiver to generate a foveated image frame based on a predicted field of view of the user. The foveated image frame is received from the rendering device, decoded, and displayed to the user.

20 Claims, 10 Drawing Sheets

(56) References Cited

U.S. PATENT DOCUMENTS

2019/0354173 A1* 11/2019 Young .................... G06F 3/012
2019/0354174 A1* 11/2019 Young .................... G09G 5/37

OTHER PUBLICATIONS

Lorde, B., "Oculus Chief Scientist Dives Deep Into the Near Future of AR & VR" 8 pgs., Oct. 16, 2018 (Retrieved at https://www.roadtovr.com/oculus-chief-scientist-michael-abrash-future-ar-vr-technology-oculus-connect-5/ on Oct. 29, 2018).
http://www.adhawkmicrosystems.com/, Oct. 20, 2017 (Retrieved on Oct. 29, 2018).

* cited by examiner

IMAGE GENERATION BASED ON BRAIN ACTIVITY MONITORING

BACKGROUND

Virtual reality (VR) and augmented reality (AR) images are typically displayed to users via a head-mounted display (HMD). The images are typically rendered on a computing device that is separate from the head-mounted display, encoded, and transmitted to the head-mounted display via wireless signals (e.g., radio). The wireless signals are received at the headset, decoded, and displayed to the user. Other types of images are also transmitted and displayed in this manner.

BRIEF DESCRIPTION OF THE DRAWINGS

A more detailed understanding can be had from the following description, given by way of example in conjunction with the accompanying drawings wherein.

DETAILED DESCRIPTION

Some implementations provide a method for generating an image frame for display to a user. Brain activity sensor data correlated with movement of a user is received. A predicted gaze direction of the user is determined based on the brain activity sensor data. An image frame is generated based on the predicted gaze direction. The image frame is transmitted to a display.

Some implementations provide a device for generating an image frame for display to a user. Receiver circuitry is configured to receive brain activity sensor data correlated with movement of a user. Processing circuitry is configured to determine a predicted gaze direction of the user based on the brain activity sensor data. Processing circuitry is configured to generate an image frame based on the predicted gaze direction. Transmitter circuitry is configured to transmit the image frame to a display.

Some implementations provide a method for receiving and displaying a foveated image frame based on a predicted gaze direction of a user. Brain activity information of a user is captured. The brain activity information is communicated to a transceiver. The brain activity information is transmitted, using the transceiver, to a rendering device to predict a gaze direction based on the brain activity information and to generate a foveated image frame based on the predicted gaze direction of the user. The foveated image frame is received from the rendering device. The foveated image frame is decoded. The foveated image frame is displayed to the user.

Figure 1:
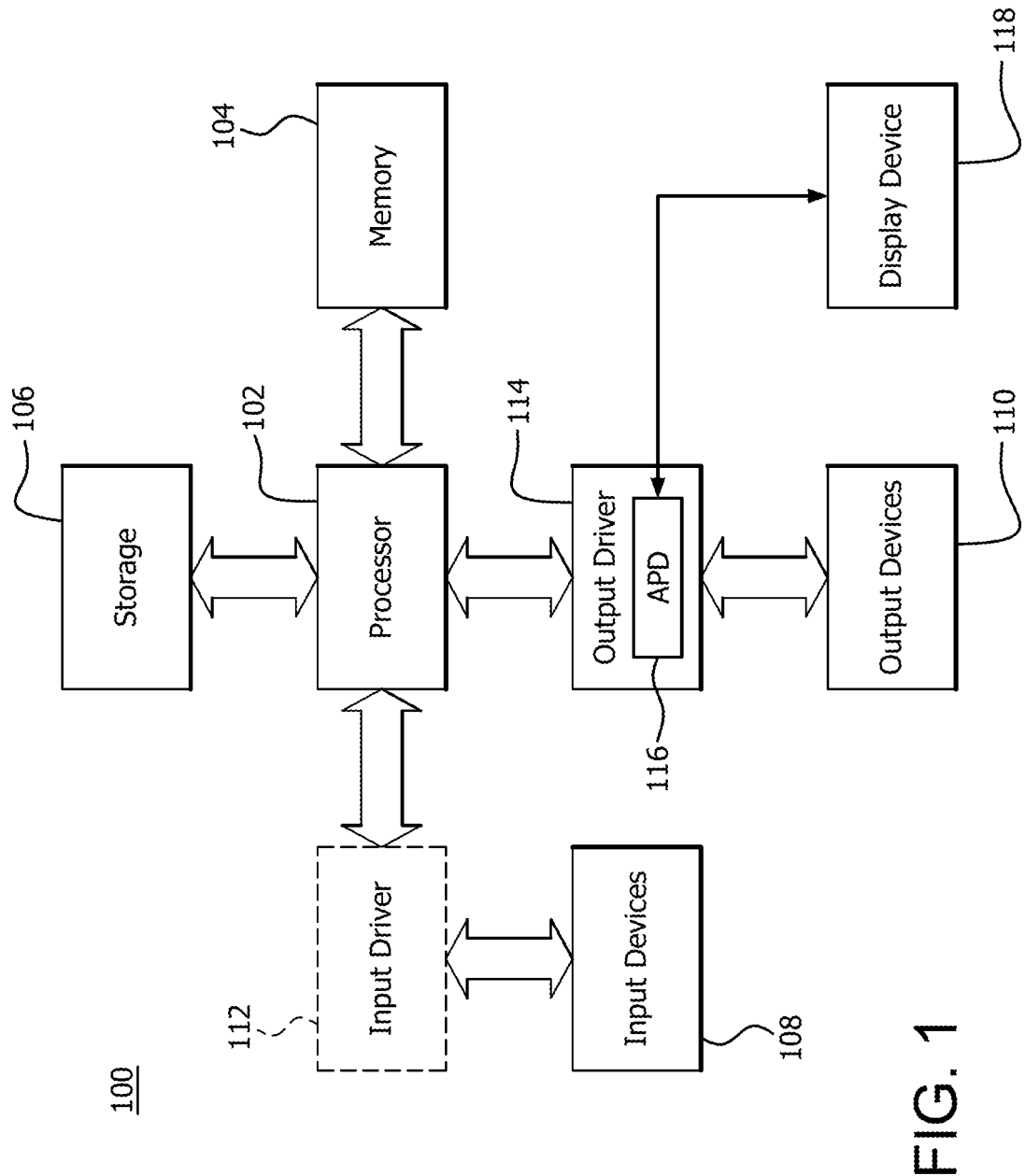
FIG. 1 is a block diagram of an example device in which one or more features of the disclosure can be implemented.

FIG. 1 is a block diagram of an example device 100 in which one or more features of the disclosure can be implemented. The device 100 could be one of, but is not limited to, for example, a computer, a gaming device, a handheld device, a set-top box, a television, a mobile phone, a tablet computer, or other computing device. The device 100 includes a processor 102, a memory 104, a storage 106, one or more input devices 108, and one or more output devices 110. The device 100 also includes one or more input drivers 112 and one or more output drivers 114. Any of the input drivers 112 are embodied as hardware, a combination of hardware and software, or software, and serve the purpose of controlling input devices 112 (e.g., controlling operation, receiving inputs from, and providing data to input drivers 112). Similarly, any of the output drivers 114 are embodied as hardware, a combination of hardware and software, or software, and serve the purpose of controlling output devices 114 (e.g., controlling operation, receiving inputs from, and providing data to output drivers 114). It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, without limitation, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, an eye gaze sensor 530, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 and output driver 114 include one or more hardware, software, and/or firmware components that are configured to interface with and drive input devices 108 and output devices 110, respectively. The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. The output driver 114 includes an accelerated processing device ("APD") 116 which is coupled to a display device 118. In some implementations, display device 118 includes a desktop monitor or television screen. In some implementations display device 118 includes a head-mounted display device ("HMD"), which includes screens for providing stereoscopic vision to a user. In some implementations the HMD also includes an eye gaze sensor for determining the direction in which the eye of a user is looking. The APD 116 is configured to accept compute commands and graphics rendering commands from processor 102, to process those compute and graphics rendering commands, and to provide pixel output to display device 118 for display. As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and configured to provide graphical output to a display device 118. For example, it is contemplated that any processing system that performs processing tasks in accordance with a SIMD paradigm may be configured to perform the functionality described herein. Alternatively, it is contemplated that computing systems that do not perform processing tasks in accordance with a SIMD paradigm performs the functionality described herein.

Figure 2:
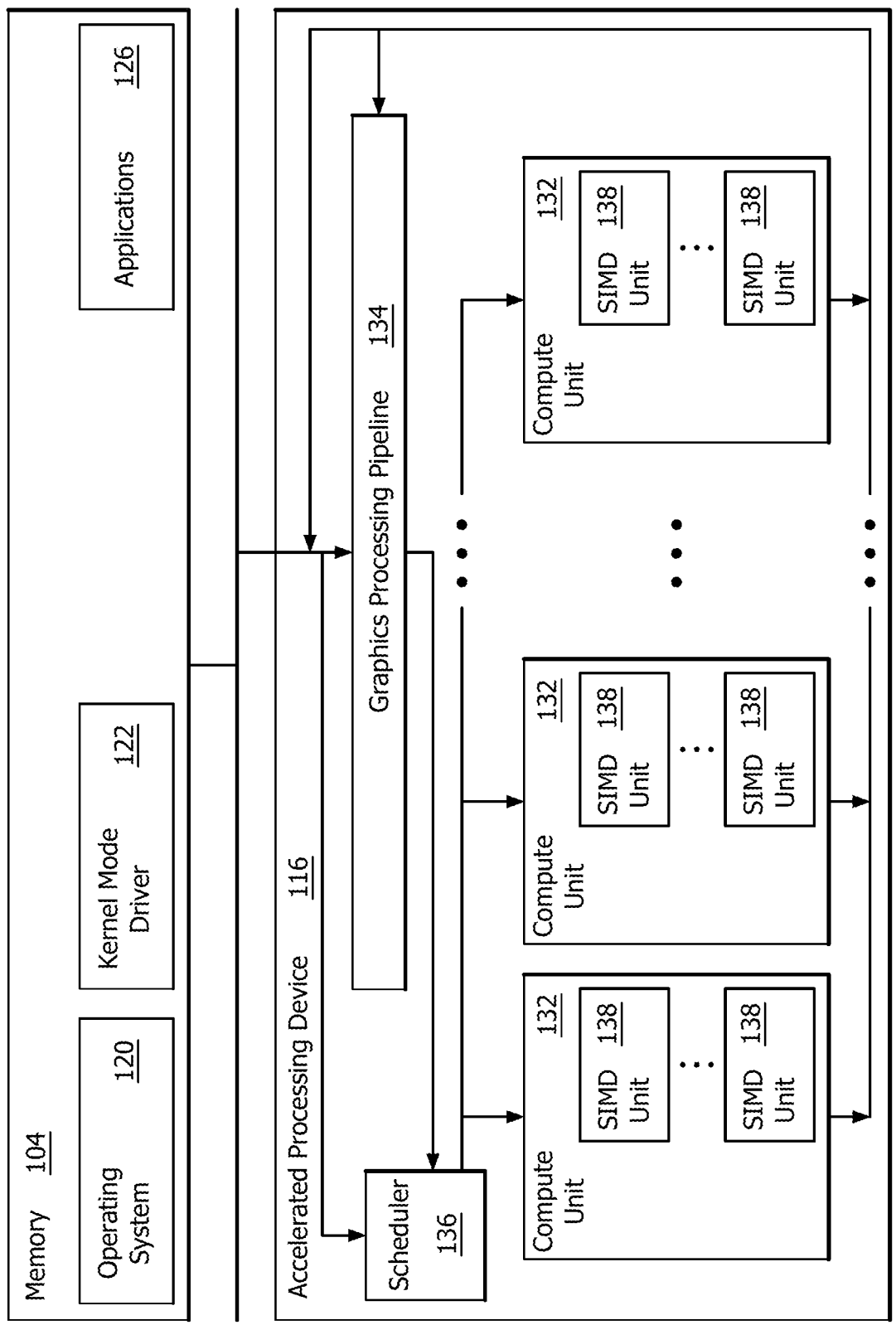
FIG. 2 illustrates details of the device of FIG. 1, according to an example.

FIG. 2 illustrates details of the device 100 and the APD 116, according to an example. The processor 102 (FIG. 1) executes an operating system 120, a driver 122, and applications 126, and may also execute other software alternatively or additionally. The operating system 120 controls various aspects of the device 100, such as managing hardware resources, processing service requests, scheduling and controlling process execution, and performing other operations. The APD driver 122 controls operation of the APD 116, sending tasks such as graphics rendering tasks or other work to the APD 116 for processing. The APD driver 122 also includes a just-in-time compiler that compiles programs for execution by processing components (such as the SIMD units 138 discussed in further detail below) of the APD 116.

The APD 116 executes commands and programs for selected functions, such as graphics operations and non-graphics operations that may be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that are configured to perform operations at the request of the processor 102 (or another unit) in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items can be executed simultaneously (or partially simultaneously and partially sequentially) as a "wavefront" on a single SIMD processing unit 138. One or more wavefronts are included in a "work group," which includes a collection of work-items designated to execute the same program. A work group can be executed by executing each of the wavefronts that make up the work group. In alternatives, the wavefronts are executed on a single SIMD unit 138 or on different SIMD units 138. Wavefronts can be thought of as the largest collection of work-items that can be executed simultaneously (or pseudo-simultaneously) on a single SIMD unit 138. "Pseudo-simultaneous" execution occurs in the case of a wavefront that is larger than the number of lanes in a SIMD unit 138. In such a situation, wavefronts are executed over multiple cycles, with different collections of the work-items being executed in different cycles. An APD scheduler 136 is configured to perform operations related to scheduling various workgroups and wavefronts on compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

Figure 3:
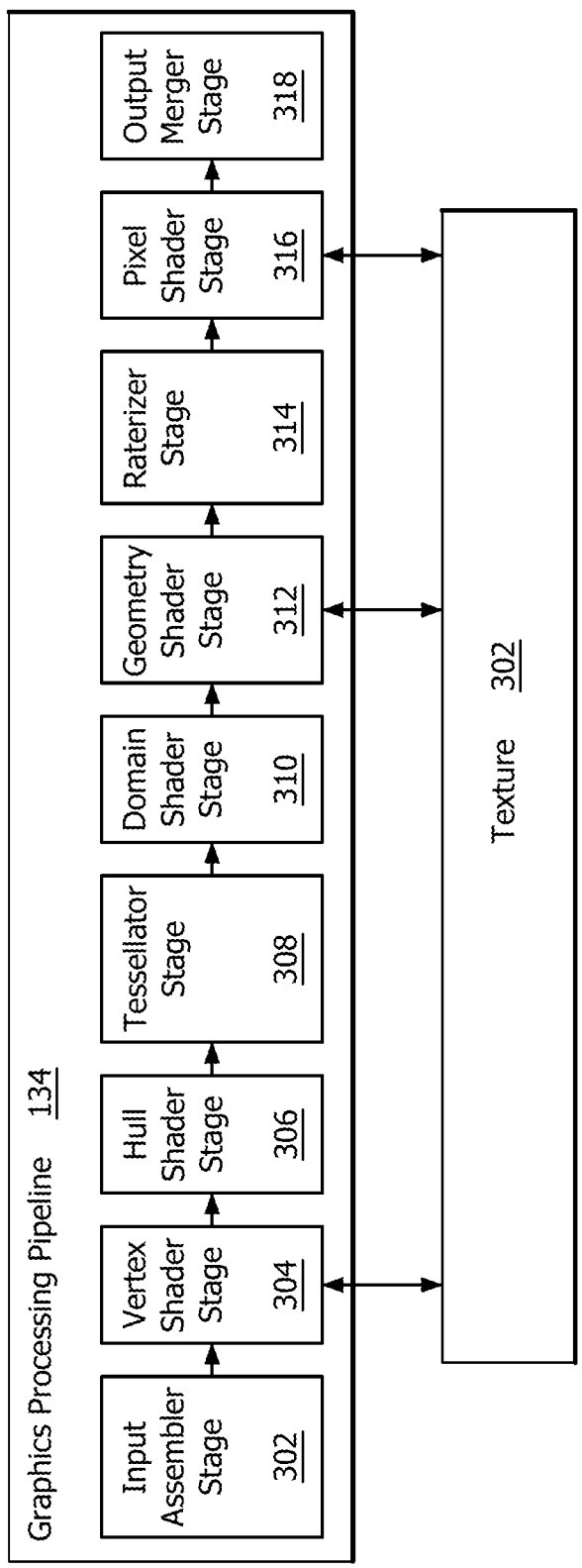
FIG. 3 is a block diagram showing additional details of the graphics processing pipeline illustrated in FIG. 2.

FIG. 3 is a block diagram showing additional details of the graphics processing pipeline 134 illustrated in FIG. 2. The graphics processing pipeline 134 includes stages that each performs specific functionality of the graphics processing pipeline 134. Each stage is implemented partially or fully as shader programs executing in the programmable compute units 132, or partially or fully as fixed-function, non-programmable hardware external to the compute units 132.

The input assembler stage 302 reads primitive data from user-filled buffers (e.g., buffers filled at the request of software executed by the processor 102, such as an application 126) and assembles the data into primitives for use by the remainder of the pipeline. The input assembler stage 302 can generate different types of primitives based on the primitive data included in the user-filled buffers. The input assembler stage 302 formats the assembled primitives for use by the rest of the pipeline.

The vertex shader stage 304 processes vertices of the primitives assembled by the input assembler stage 302. The vertex shader stage 304 performs various per-vertex operations such as transformations, skinning, morphing, and per-vertex lighting. Transformation operations include various operations to transform the coordinates of the vertices. These operations include one or more of modeling transformations, viewing transformations, projection transformations, perspective division, and viewport transformations, which modify vertex coordinates, and other operations that modify non-coordinate attributes.

The vertex shader stage 304 is implemented partially or fully as vertex shader programs to be executed on one or more compute units 132. The vertex shader programs are provided by the processor 102 and are based on programs that are pre-written by a computer programmer. The driver 122 compiles such computer programs to generate the vertex shader programs having a format suitable for execution within the compute units 132.

The hull shader stage 306, tessellator stage 308, and domain shader stage 310 work together to implement tessellation, which converts simple primitives into more complex primitives by subdividing the primitives. The hull shader stage 306 generates a patch for the tessellation based on an input primitive. The tessellator stage 308 generates a set of samples for the patch. The domain shader stage 310 calculates vertex positions for the vertices corresponding to the samples for the patch. The hull shader stage 306 and domain shader stage 310 can be implemented as shader programs to be executed on the compute units 132, that are compiled by the driver 122 as with the vertex shader stage 304.

The geometry shader stage 312 performs vertex operations on a primitive-by-primitive basis. A variety of different types of operations can be performed by the geometry shader stage 312, including operations such as point sprite expansion, dynamic particle system operations, fur-fin generation, shadow volume generation, single pass render-to-cubemap, per-primitive material swapping, and per-primitive material setup. In some instances, a geometry shader program that is compiled by the driver 122 and that executes on the compute units 132 performs operations for the geometry shader stage 312.

The rasterizer stage 314 accepts and rasterizes simple primitives (triangles) generated upstream from the rasterizer stage 314. Rasterization consists of determining which screen pixels (or sub-pixel samples) are covered by a particular primitive. Rasterization is performed by fixed function hardware.

The pixel shader stage 316 calculates output values for screen pixels based on the primitives generated upstream and the results of rasterization. The pixel shader stage 316 may apply textures from texture memory. Operations for the pixel shader stage 316 are performed by a pixel shader program that is compiled by the driver 122 and that executes on the compute units 132.

The output merger stage 318 accepts output from the pixel shader stage 316 and merges those outputs into a frame buffer, performing operations such as z-testing and alpha blending to determine the final color for the screen pixels.

Images presented on a head-mounted display ("HMD") are typically rendered on a separate device (e.g., device 100 as shown and described with respect to FIGS. 1-3) and transmitted to the HMD via a suitable interface, which is typically a wireless interface. Regardless of the interface used, transmission of the image data to the HMD is limited by the maximum bit rate of the interface, and accrues latency corresponding to the speed of the interface and the size of the image data.

It is typically desirable to display rendered graphics at a frame rate (e.g., 60, 90, 120 frames per second) and resolution that are high enough to provide a convincingly immersive experience for the user. Transmitting rendered graphics at such frame rates and/or resolutions presents a challenge for the limits of the latency and maximum bit rate of the transmission medium. Accordingly, various techniques and devices are presented to reduce the latency and/or bit rate of the transmission while having no effect, or an acceptably low effect, on the resolution and frame rate of the rendered graphics as perceived by the user of an HMD or other display.

The human visual system includes both the eyes and the brain. It is observed that the eyes perceive maximum detail only in the very center of the visual field, and perceive less detail moving out from the center toward the periphery of the field. The reduced detail at the periphery is typically not consciously perceived, as the brain "fills in" the missing detail based on inference, earlier observations of that portion of the scene, and other factors. Accordingly, an image of a scene need only include maximum detail of the scene in areas of the image to which the center of the viewer's visual field is directed in order to appear fully detailed to the viewer. Correspondingly less detail is required for portions of the image further away from these areas.

These observations can be leveraged to reduce the amount of data required to transmit rendered graphics to achieve a desired fidelity as perceived by the user. For example, only those portions of a frame within the center of a user's field of view need to be encoded at full fidelity. Fidelity, as used herein, refers to the quality of the image as experienced by the viewer. In some implementations, fidelity is based on, or identical with, image resolution (i.e., number of picture elements (e.g., x,y) per image area). It is understood however that in other implementations fidelity can include further or different aspects of the experience. Portions of the frame falling within the paracentral, near-peripheral, mid-peripheral, and far peripheral areas of the user's field of view can be transmitted at correspondingly lower fidelity with less impact on the overall fidelity of the image as perceived by the user. Encoding rendered graphics (or other image information) based on the expected location of the center of the viewer's field of view in this way is referred to as foveated encoding. In some implementations, reducing the fidelity of part or all of an image has the advantage of reducing resource requirements for processing, transmitting, and/or displaying the image (e.g., reduced computing power, bandwidth, screen resolution, latency, or other requirements). In some implementations, reducing the fidelity includes reducing the image resolution. By reducing fidelity in peripheral regions of an image, as opposed to (or to a greater degree than) in central regions of an image, the resource requirement reductions discussed above can be achieved with little or no perceptual difference to the human visual system in some implementations.

These observations can also be leveraged to reduce the amount of processing required to render an image based on graphics data to achieve a desired fidelity of the rendered image as perceived by the user. Rendering graphics data (or other scene information) based on the expected location of the center of the viewer's field of view in this way is referred to as foveated rendering, and the resulting image or image frame is referred to as a foveated image or foveated image frame.

Figure 4:
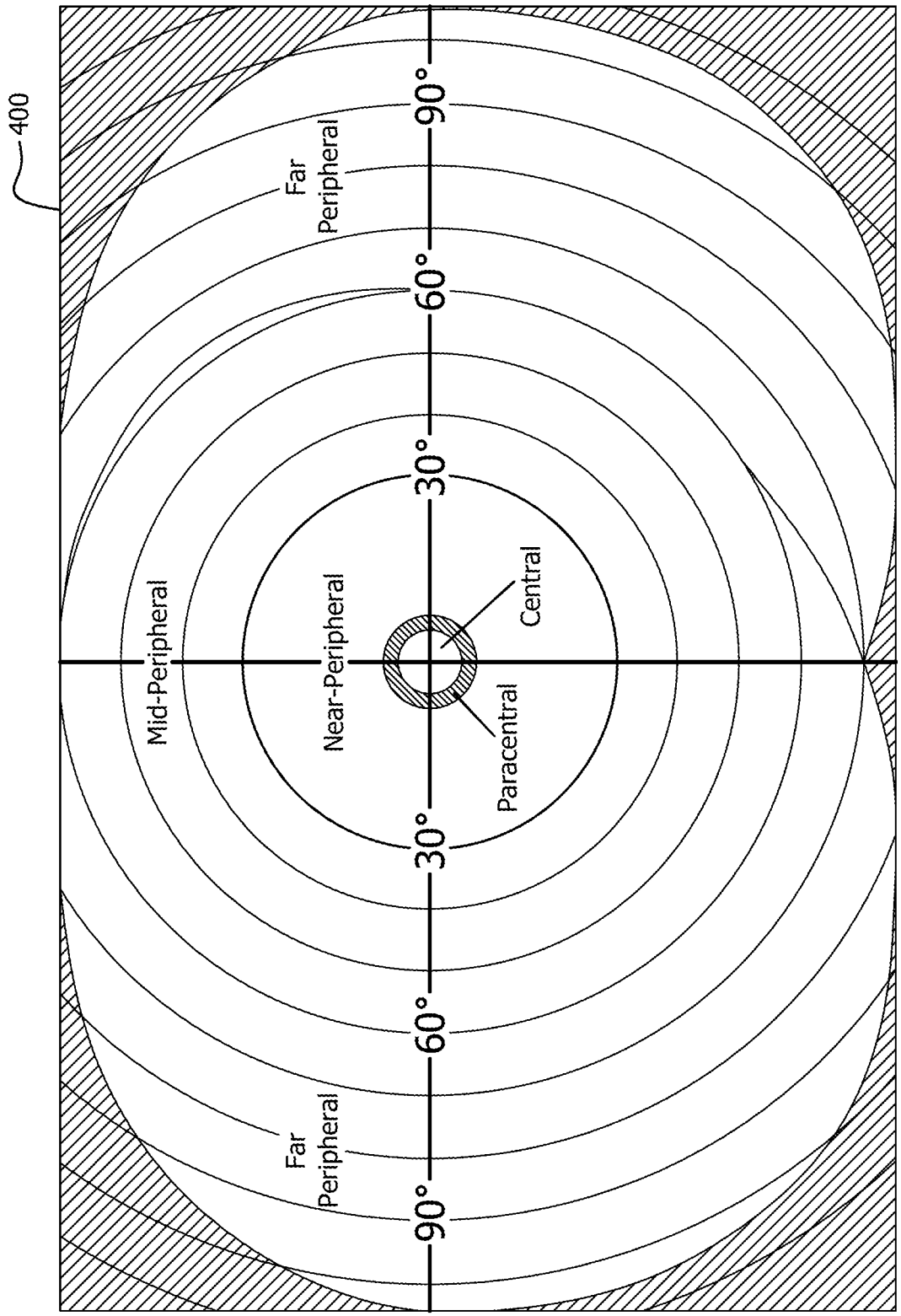
FIG. 4 is a diagram illustrating an example breakdown of various portions of a human field of view.

FIG. 4 is a diagram illustrating an example breakdown of various portions of a human field of view 400. In the example of FIG. 4, the human field of view is broken down into paracentral, near-peripheral, mid-peripheral, and far peripheral areas, defined by certain angles as shown. These areas and angles are arbitrary to a certain extent. For purposes of foveated encoding or foveated rendering, different areas can be defined (e.g., using different angles, areas, or shapes), and/or a greater or lesser number of areas can be defined, in different implementations. In some implementations, for each defined area of field of view 400 is encoded at a different bit rate (foveated encoding), and/or is rendered at a different fidelity (foveated rendering). In some implementations, the maximum bit rate and/or fidelity would be applied in the central area, with progressively lower bit rates and/or fidelity moving outward toward the far peripheral area. Adjusting the fidelity in this context includes various interventions in various implementations. For example, in some implementations, reducing fidelity includes reducing image resolution in the image area, reducing the amount of detail in the image area, reducing the amount of texturing in the image area, eliminating objects in the image area (e.g., which fall below a size, contrast, and/or movement threshold), reducing image detail in the image data (e.g., at the rendering device) with reconstructed image detail (e.g., at the display device, e.g., using machine learning), or other aspects.

In typical still images, all areas of the frame are presented at full fidelity (excepting artistic or other special effects, such as wide aperture out of focus areas used to direct the user's attention or for other purposes). Among other reasons, this is done because typical systems do not apply foveated encoding or foveated rendering, and do not adequately predict where the center of the viewer's field of view will fall on the image. In some implementations, the center of the viewer's field of vision at a future time when the viewer will view the frame is predicted, e.g., in order to implement foveated encoding or foveated rendering.

Crude gaze prediction can be performed by tracking the position of the user's eyes and/or head with a camera to create a history. A future position of the head, eye, and/or gaze is extrapolated from the historical data into the future. Such camera-based tracking is computationally expensive and relies on processing images taken as the eye moves. Accordingly, these techniques provide gaze prediction only after the eye movement occurs, and do not provide a gaze prediction early enough to facilitate foveated encoding or foveated rendering in some implementations. Similarly, purely camera-based eye tracking is not able to predict a saccade before it begins.

Muscles in the human body are activated by electrical signals generated by the brain and transmitted to those muscles. It is observed that the brain activity and signals which stimulate activation of the muscles which produce movement of the eyes and movement of the head anticipate (i.e., precede) the movement, typically on the order of approximately 50 milliseconds. These brain activity and activation signals are able to be monitored using sensors, such as an electroencephalography (EEG) sensor, magnetoencephalography (MEG) sensor, or any other suitable brain signal sensing or inference devices. Such sensors are mountable in a HMD, or in another suitable position relative to the user.

It is possible to analyze the sensed brain activity and/or activation signals to determine a future position of the gaze (eyes, head, etc.) in order to implement foveated encoding or foveated rendering. In various implementations, such analysis is performed using any suitable processing hardware, such as an artificial neural network (ANN) that has been trained using a training data set constructed based on brain activity and/or activation signal sensor data from a suitable sample of users.

In some implementations, both the brain activity and/or activation signal data, which is correlated with a future position of the viewer's gaze (e.g., approximately 50 milliseconds in the future), and historical data, such as gaze tracking data and/or head position data, can be combined to generate a prediction of the future direction of the viewer's gaze (e.g., by extrapolation or other suitable data analysis). In some implementations this has the advantage of increasing the accuracy of the prediction. In some implementations, the prediction is based on brain activity and/or activation signal data alone, or in combination with historical and/or current gaze and/or head position. The position or positions of other body parts are used in the prediction in some implementations.

Figure 5:
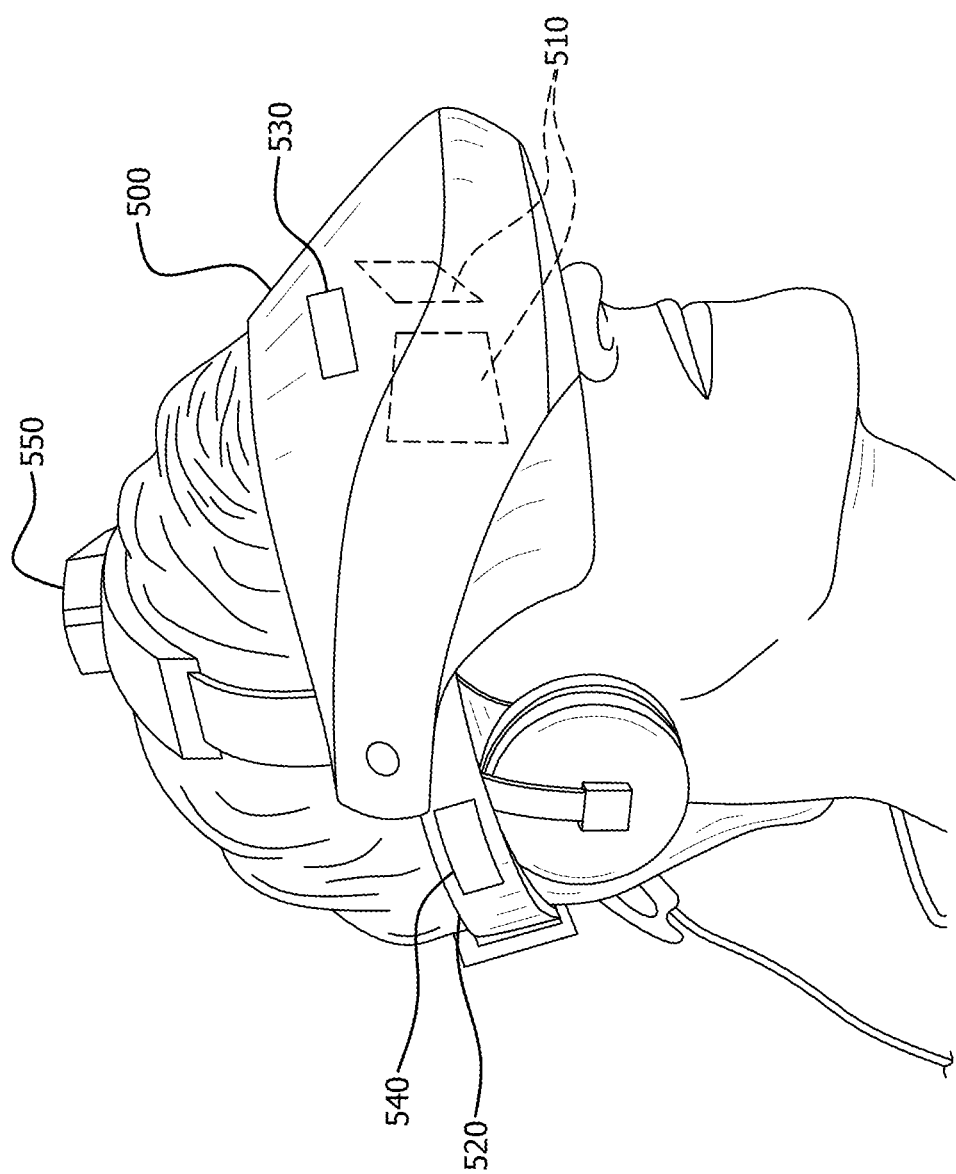
FIG. 5 is a projection view of an example HMD.

FIG. 5 illustrates an example HMD 500. HMD 500 includes two display screens 510, eye gaze sensor 530, brain activity sensor 540, and processing circuitry 550. HMD 500 is mounted on the head 520 of a user such that the user's eyes are able to view display screens 510. The position of display screens 510 (and other devices) as shown in FIG. 5 is exemplary only. In other implementations, a single display screen or more than two display screens are used. In the example of HMD 500, the two display screens 510 are configured to display stereoscopic images to the user. Specifically, the pair of screens 510 display pairs of images, each pair including stereo disparity, by which the user infers depth of various features in the field of view. In some implementations, any suitable display hardware is used to implement display screens 510, such as a liquid crystal display (LCD), light-emitting diode (LED), organic light-emitting diode (OLED), or any other technically feasible display device. In some implementations, non-stereoscopic images are displayed.

Eye gaze sensor 530 is positioned within HMD 500 such that it is able to capture images of one or both eyes of the user. The position of eye gaze sensor 530 as shown in FIG. 5 is exemplary only. In some implementations, more than one eye gaze sensor is used, or the eye gaze sensor is omitted. In some implementations, eye gaze sensor 530 is implemented using any suitable hardware, such as a charge-coupled device (CCD) sensor, or any other technically feasible image capture device. Eye gaze sensor 530 is not limited to a camera, and in some implementations includes any hardware that can detect gaze direction, such as an electromechanical sensor. In some implementations, eye gaze sensor 530 includes more than one sensing modality, such as both an image sensor and an electromechanical sensor. In some implementations, data from different sensors is processed using sensor fusion techniques to determine eye gaze direction.

Brain activity sensor 540 is positioned within HMD 500 such that it is able to capture brain activity and/or resulting electrical muscle activation signals of the user that are correlated with future movement of the user's field of view (e.g., eye movement and/or head movement). The position of sensor 540 as shown in FIG. 5 is exemplary only. In some implementations, more than one brain activity and/or activation signal sensor is used. Any suitable brain activity and/or activation signal sensing hardware can be used to implement sensor 540, such as an EEG sensor, or any other technically feasible brain activity and/or activation signal sensing device. Although sensor 540 is referred to as a "brain activity sensor" it is noted that in some implementations brain activity sensor 540 senses brain activity (e.g., brain signals), muscle activity, electrical muscle activation signals, any other suitable body signals correlated with body movement related to gaze direction, or any combination of these. The term "brain activity" is used without limitation herein for ease of reference.

Processing circuitry 550 is communicatively coupled with display screens 510, eye gaze sensor 530, and brain activity sensor 540. The position of processing circuitry 550 as shown in FIG. 5 is exemplary only. Processing circuitry 550 includes wireless communications circuitry, such as a radio transceiver. Any suitable wireless communications circuitry can be used. The communications circuitry is configured to receive wireless signals containing information for display on display screens 510. In some implementations, wired communications are used.

Processing circuitry 550 includes decoding circuitry in some implementations. The decoding circuitry decodes the information from the wireless signals (e.g., using a video codec or other suitable decoding circuitry, firmware, and/or software) and otherwise prepares the information for display on display screens 510. In some implementations such preparation includes decompression, compositing of multiple video streams (e.g., coarse and finely-detailed) or any other suitable preparation. After decoding (if required), the information is communicated to display screens 510 for display.

Processing circuitry 550 includes position and/or orientation sensing circuitry in some implementations. The position and/or orientation sensing circuitry senses a position and/or orientation of the user, such as the position and/or orientation of the user's head 520, eyes, or any other position and/or orientation relevant to the direction of the user's gaze. In some implementations, this position and/or orientation is relative to fixed space. In some implementations the position and/or orientation sensing circuitry includes motion sensing circuitry (such as an accelerometer or electronic gyroscope), range finding circuitry, or any other suitable position and/or orientation sensing circuitry. In some embodiments, processing circuitry 550 captures position and/or orientation in six degrees of freedom (6DOF). In some embodiments, processing circuitry 550 captures position and/or orientation in a greater or lesser number of degrees of freedom.

In some implementations, the position and/or orientation sensing circuitry is configured to process information from eye gaze sensor 530 to determine a point or area in an image plane generated by display screens 510 on which the user's field of view is centered. In some implementations, the information from eye gaze sensor 530 is transmitted to another device for this processing.

Processing circuitry 550 includes brain activity and/or muscle activation signal processing circuitry in some implementations. In some implementations, processing circuitry 550 includes circuitry for preparing signals from brain activity sensor 540 for transmission to another device for processing to predict the user's gaze direction. In some implementations, such preparations include signal compression. In some implementations, processing circuitry 550 includes circuitry for processing signals from brain activity sensor 540 to predict the user's gaze direction and/or field of view, such as a suitably trained ANN. In some implementations, processing circuitry 550 includes circuitry for preparing a predicted gaze direction and/or field of view for transmission to another device for processing (e.g., to inform rendering or encoding of image data for transmission to HMD 500). In some implementations, processing circuitry predicts the user's gaze direction and/or field of view based on the information from brain activity sensor 540, the user's head and/or eye position and/or orientation (e.g., as determined using eye gaze sensor 530 and/or position and/or orientation sensors), and/or historical information regarding prior head and/or eye positions and/or orientations.

The various components of processing circuitry 550 are shown and described with respect to FIG. 5 as a single unit for clarity and convenience, however in other implementations some or all of these components are implemented as separate components.

Figure 6:
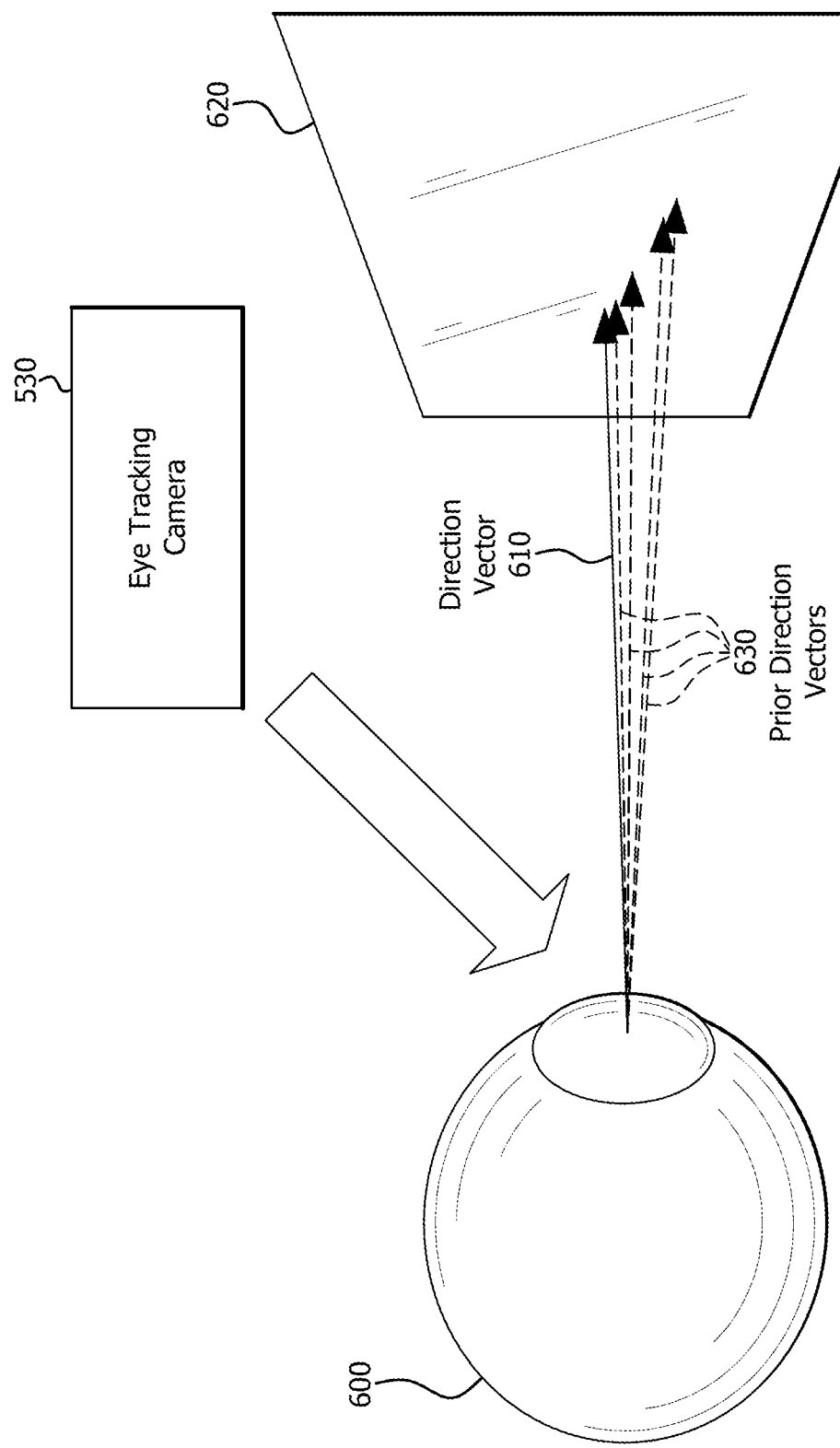
FIG. 6 is a projection view illustrating eye tracking functionality of the HMD.

FIG. 6 illustrates example eye tracking functionality of the HMD 500. Other suitable eye tracking functionality is usable in other implementations. As described with respect to FIG. 5, HMD 500 includes an eye gaze sensor 530. The eye gaze sensor 530 senses the position and/or orientation of one or both eyes of the user within the HMD 500 (represented by eye 600 in FIG. 6). Information captured by eye gaze sensor 530 is processed by processing circuitry 550 (as described with respect to FIG. 5) to detect a point or area of image plane 620, generated by display screens 510 (shown and described with respect to FIG. 5), upon which the field of view of the user is centered.

In some implementations, the information captured by eye gaze sensor 530 is processed to determine a point or area of the image on which the user's field of vision is centered. In some implementations, the information is processed by processing circuitry 550, or is transmitted to another device for processing. In some implementations, determining the point or area of the image on which the user's field of vision is centered includes processing the captured information to generate a direction vector 610 for eye 600. Direction vector 610 indicates the direction and position of the center of the field of vision of eye 600. In some implementations, direction vector 610 includes both a position (point of origin; e.g., the fovea of the user's eye) and a direction, such that direction vector 610 indicates a point of intersection with an image plane 620 generated by display screens 510 (shown and described with respect to FIG. 5). In some implementations, the point of intersection with image plane 620 corresponds to a point or area of the image on which the eye's gaze is centered.

FIG. 6 also illustrates several prior direction vectors 630. Prior direction vectors 630 represent direction vectors detected before the most recent direction vector 610 is detected. Several prior detection vectors 630 are illustrated. It can be seen from these prior direction vectors 630 that the gaze of the eye has moved across the image plane 620. In some implementations, the timing of direction vector detection does not need to be synchronized with the display of frames displayed on image plane 620. For example, direction vectors indicating position and direction of eye gazes may be detected more frequently than frames are displayed on image plane 620, and at times that are different than the times at which frames are updated on image plane 620.

In some implementations, timing of the direction vectors is recorded using timestamps associated with the direction vectors, which indicate the time at which the direction vectors are captured. In some implementations, the time stamps are recorded by processing circuitry 550, or by another device (e.g., after the direction vectors are transmitted to a device rendering the frames displayed on image plane 620). In some implementations, if the timing of the direction vectors is not time-aligned with the frames, the direction vectors are processed (e.g., interpolated) to generate direction vectors corresponding to time-slices represented by the frames.

Figure 7:
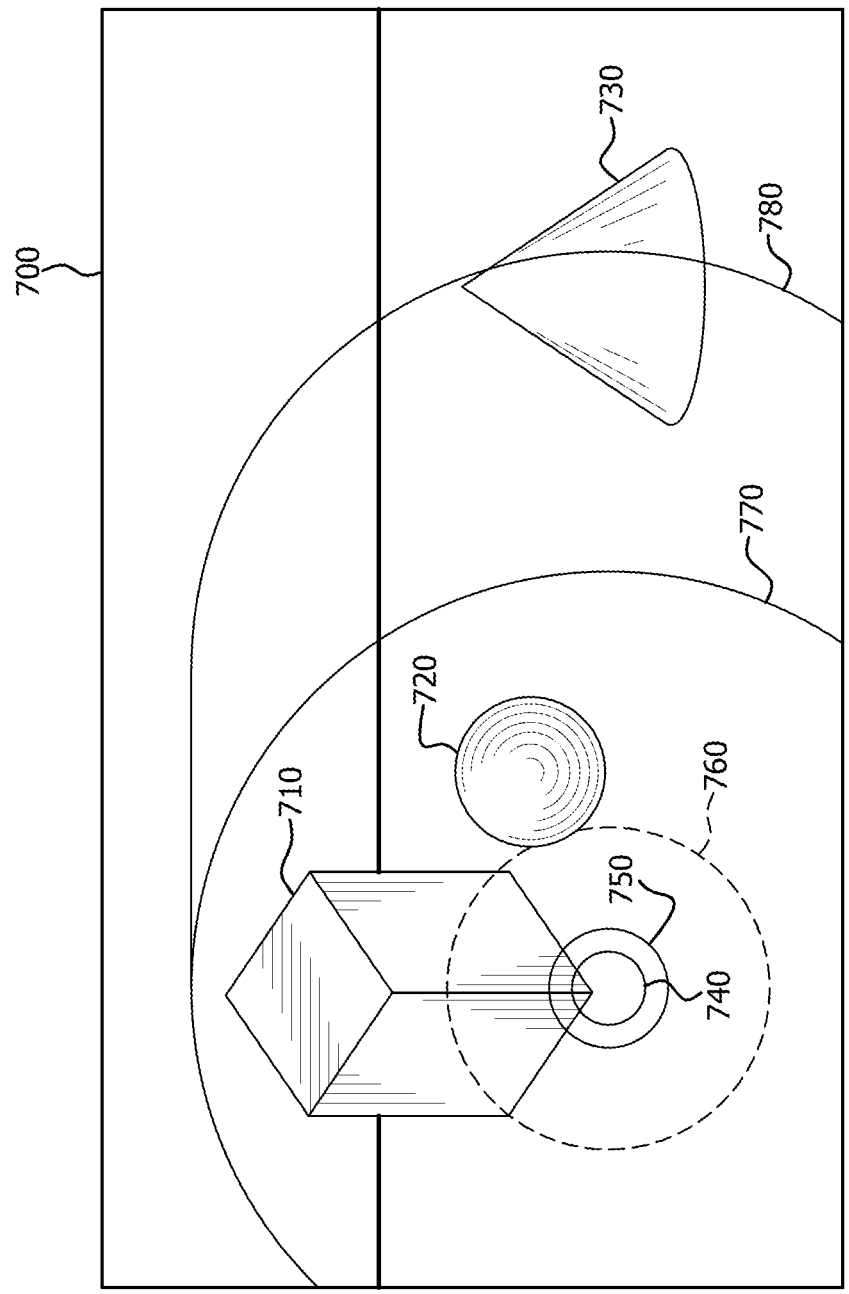
FIG. 7 is a front view of an example image displayed on an image plane showing an example field of view of a user of the HMD.

FIG. 7 illustrates an example image 700 displayed on image plane 620 by display screens 510 of HMD 500. Example image 700 includes three objects 710, 720, 730.

A predicted field of view of the user of HMD 500 is illustrated with respect to image 700 for reference, although it is noted that these markings are not part of image 700. In some implementations, the predicted field of view of the user is predicted based on a predicted gaze direction of the user. The predicted field of view includes central area 740, paracentral area 750, near-peripheral area 760, mid-peripheral area 770, and far-peripheral area 780. These areas are exemplary only and it is noted that different areas can be defined (e.g., using different angles, areas, or shapes), and/or a greater or lesser number of areas can be defined, in different implementations. In some implementations, the position of the field of view, and of the different areas, can be used for area-specific processing of image 700 (e.g., foveated processing). For example, in some implementations, the position of the field of view is predicted before image 700 is encoded for transmission to HMD 500, and the predicted field of view is used for foveated encoding of the image 700 for transmission (e.g., by assigning a desired encoding bit rate to each of central area 740, paracentral area 750, near-peripheral area 760, mid-peripheral area 770, and far-peripheral area 780 respectively). In some implementations, the position of the field of view is predicted before image 700 is rendered from graphics data, and the predicted field of view is used for foveated rendering of the image 700 (e.g., by assigning a desired image fidelity to each of central area 740, paracentral area 750, near-peripheral area 760, mid-peripheral area 770, and far-peripheral area 780). Portions of image 700 are outside of the predicted field of view in this example.

Within image 700, portions of the image of object 730 fall within the far-peripheral area 780 of the predicted field of view. Accordingly, these portions are rendered in a way that is suitable, preferable, or optimized for foveated rendering of the graphics data falling in the far-peripheral area and/or are encoded for transmission to HMD 500 using a bit rate designated for foveated encoding of the image data falling in the far-peripheral area. One example way of rendering a portion for foveated rendering includes rendering that portion at a fidelity designated for graphics data falling in that portion. In this example, in some implementations, other portions are rendered at a fidelity designated for each of those portions. It is noted that foveated rendering and foveated encoding are example applications of the predicted field of view. Other implementations perform other processing based on the predicted field of view.

Other portions of the image of object 730 fall outside of the defined areas of the predicted field of view. Accordingly, these portions are rendered at the lowest fidelity designated for foveated rendering of the graphics data being processed and/or is encoded for transmission to HMD 500 using the lowest bit rate designated for foveated encoding of the image data. In some implementations, portions of image 700 falling outside of the far-peripheral area 780, such as portions of the image of object 730, are not encoded or not rendered; e.g., because they are not visible to the user. In some implementations, portions of image 700 falling outside of the far-peripheral area 780 are processed (e.g., rendered and/or encoded) and transmitted to HMD 500 for other purposes. For example, in some implementations, these portions are encoded and transmitted to enable time warping. Time warping in this context refers to adjusting an earlier transmitted frame to correspond to an updated gaze direction. In some such cases, for example, if the users gaze moves to include a portion of image 700 that formerly fell outside the far-peripheral area 780, time warping can provide image data to the user until a new image based on the new gaze can be generated and/or sent to the HMD 500.

The image of object 720 falls entirely within the mid-peripheral area 770 of the predicted field of view. Accordingly, the image of object 720 is rendered at a fidelity that is designated for foveated rendering of the graphics data falling in the mid-peripheral area and/or is encoded for transmission to HMD 500 using a bit rate designated for foveated encoding of the image data falling in the mid-peripheral area. Accordingly, the image of object 720 is encoded at a higher bit rate and/or is rendered at a higher fidelity than portions of image 700 corresponding to object 730.

Different portions of the image of object 710 fall within central area 740, paracentral area 750, near-peripheral area 760, and mid-peripheral area 770 of the predicted field of view. Accordingly, the different portions are each rendered at a fidelity that is designated for foveated rendering of graphics data falling in the corresponding area of the predicted field of view and/or is encoded for transmission to HMD 500 using a bit rate designated for foveated encoding of the image data falling in the corresponding area of the predicted field of view. Thus, all of the image of object 710 is encoded at a higher bit rate and/or is rendered at a higher fidelity than the image of object 730. In contrast, some parts of the image of object 710 are encoded at a higher bit rate and/or are rendered at a higher fidelity than the image of object 720 (i.e., parts of the image of object 710 falling in the central area 740, paracentral area 750, and near-peripheral area 760), while other parts of the image of object 710 are encoded at the same bit rate and/or rendered at the same fidelity as the image of object 720 (i.e., parts of the image of object 710 falling in the mid-peripheral area 770.

It is noted that foveated processing of image 700 (e.g., foveated encoding, foveated rendering, etc.) can be based on any suitably shaped field of view, such as a circular, oval, square, or any desired shape, and need not conform to a shape defined by the human visual field. For example, in some implementations, a field of view includes one or more areas of an image which are defined by progressively larger concentric circles centered on the predicted gaze direction of the user. In some implementations, concentric or non-concentric circles, ovals, squares, rectangles, or any other arbitrary shapes or combinations thereof, etc., are used.

Figure 8:
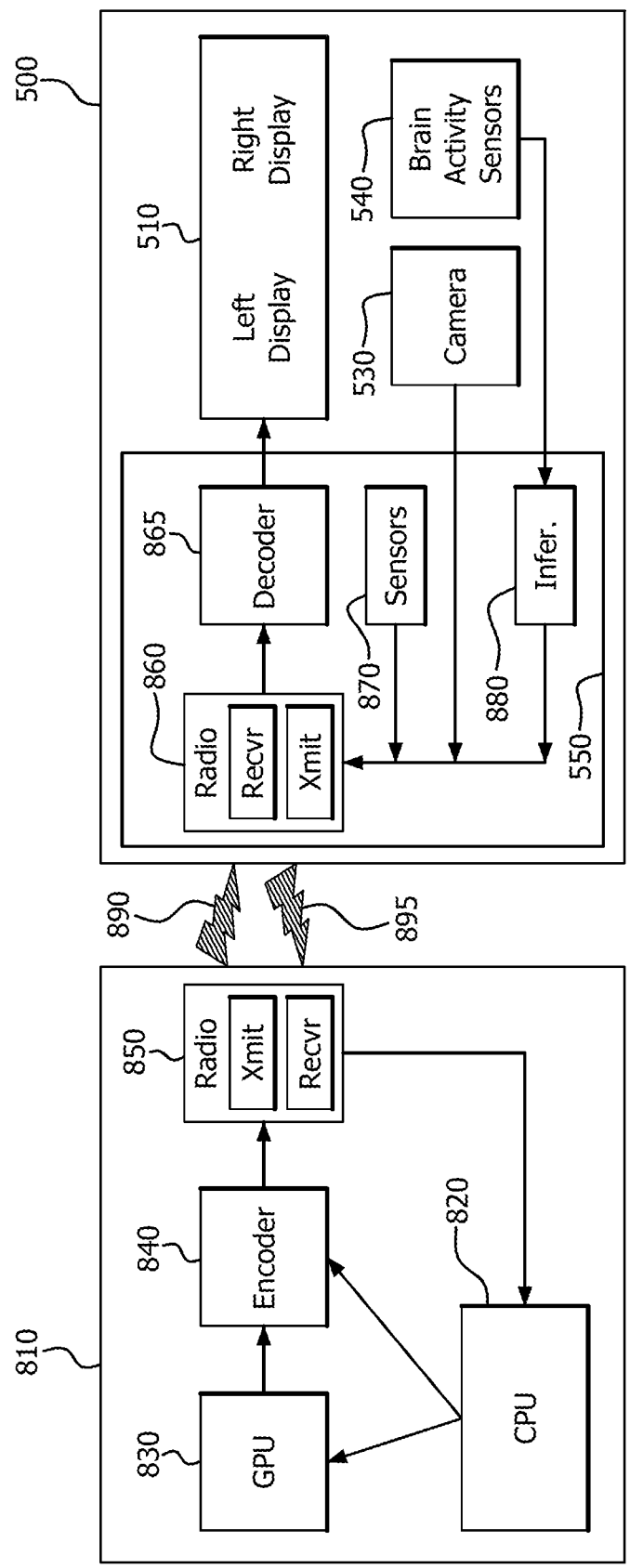
FIG. 8 is a block diagram illustrating an example system for rendering and displaying images to a user.

FIG. 8 is a block diagram illustrating an example system 800 for rendering and displaying images to a user. System 800 includes HMD 500 (described with respect to FIG. 5) and rendering device 810. For clarity, as in the other figures, only a subset of the components and functionality of system 800 is shown and described with respect to FIG. 8.

Rendering device 810 is a computing device configured to render computer graphics information to produce image data. Rendering device 810 is implemented using device 100 (described with respect to FIG. 1) in this example. In other implementations, a subset of the components of device 100, a device that is substantially similar to device 100, or any other suitable computing device is used. In some implementations, different components of rendering device 810 are implemented in separate devices.

Rendering device 810 includes a CPU 820, GPU 830, encoding circuitry 840, and wireless communications circuitry. In some implementations, the communications circuitry is configured for wired communications, or a combination of wired and wireless communications. The wireless communications circuitry includes a radio transceiver 850 in this example. Radio transceiver 850 receives wireless signals 895 from HMD 500. Wireless signals 895 include feedback information for foveated rendering and/or foveated encoding of image data. In some implementations the feedback information includes brain activity sensor information, eye tracking information, and/or user position and/or orientation information (e.g., regarding head position and/or orientation).

CPU 820 is implemented using processor 102 (described with respect to FIG. 1) in this example. In other implementations, any suitable CPU or other processing device is used.

CPU 820 receives feedback information from radio transceiver 850. Based on the feedback information, CPU 820 predicts the field of view of the user for a future time when an image frame rendered by GPU 830 and encoded by encoding circuitry 840 will be displayed to the user by HMD 500. CPU 820 generates commands for GPU 830 and encoding circuitry 840 based on the predicted field of view.

GPU 830 is implemented using APD 116 (described with respect to FIG. 1) in this example. In other implementations, any suitable GPU or other processing device is used. GPU 830 receives the commands generated by CPU 820, and based on the commands, performs foveated rendering of graphics data to generate an image frame having different fidelity in different regions of the image frame corresponding to different regions of the predicted field of view. GPU 830 renders the image frame and communicates the image frame to encoding circuitry 840 for encoding.

Encoding circuitry 840 is implemented using output driver 114 (described with respect to FIG. 1) in this example. In other implementations, any suitable encoder or other processing circuitry is used. Encoding circuitry 840 receives the commands generated by CPU 820, and based on the commands, performs foveated encoding of the rendered image frame at different bit rates for different regions of the image frame corresponding to different regions of the predicted field of view. Encoding circuitry 840 encodes the image frame (e.g., using a video codec) and communicates the encoded image frame to radio transceiver 850 for transmission to HMD 500 using wireless signals 890.

In some implementations, CPU 820 processes the feedback information to generate the predicted field of view (e.g., using an ANN trained to infer the predicted field of view from brain activity and/or other position and/or orientation information in the feedback). In some implementations, processing to generate the predicted field of view is performed by a specialized hardware accelerator on CPU 820, or in communication with CPU 820, or by another device. In some implementations, some or all of the prediction is performed by circuitry of HMD 500, or another device, and the predicted field of view is communicated to CPU 820 which generates the commands for GPU 830 and/or encoding circuitry 840 based on the received prediction.

Example rendering device 810 performs both foveated rendering and foveated encoding. In some implementations a corresponding rendering device performs foveated rendering only, or foveated encoding only.

HMD 500 includes two display screens 510, eye gaze sensor 530, brain activity sensor 540, and processing circuitry 550. Processing circuitry 550 includes wireless communications circuitry, which is a radio transceiver 860 in this example. Processing circuitry 550 also includes decoding circuitry 865, position and/or orientation sensing circuitry 870, and brain activity signal processing circuitry 880. System 800 is implemented using HMD 500 for exemplary purposes. In other implementations, a subset of the components of HMD 500, a device that is substantially similar to HMD 500, or any other suitable HMD or other display or motion tracking device is used. For example, in some implementations, a desktop display, television screen, or other non-head-mounted monitor device can be used; e.g., in conjunction with a separate or attached gaze tracking device.

Radio transceiver 860 receives wireless signals 890 from rendering device 810. Wireless signals 890 contain an image frame for display on display screens 510. Decoding circuitry 865 decodes the image frame (e.g., using a video codec) from wireless signals 890 and communicates the image frame to display screens 510 for display to a user. The image frame has different fidelity in different regions, each region corresponding to an area of the field of view of the user predicted for the time the image is displayed.

Brain activity sensor 540 senses brain activity and/or activation signals of the user which are correlated with future movement of the user's field of view (e.g., eye movement and/or head movement). Brain activity sensor 540 communicates this information to radio transceiver 860 for transmission to rendering device 810 as feedback. In some implementations, brain activity signal processing circuitry 880 processes raw data from brain activity sensor 540 (e.g., formats, compresses, or infers a predicted field of view from sensor outputs) before transmission to HMD 500 using radio transceiver 860.

Eye gaze sensor 530 tracks the position and/or orientation of the user's eyes and communicates this information to radio transceiver 860 for transmission to rendering device 810 as feedback. Position and/or orientation sensing circuitry 870 senses a position and/or orientation of the user (e.g., head and/or eye position and/or orientation) and communicates this information to radio transceiver 860 for transmission to rendering device 810 as feedback.

Figure 9:
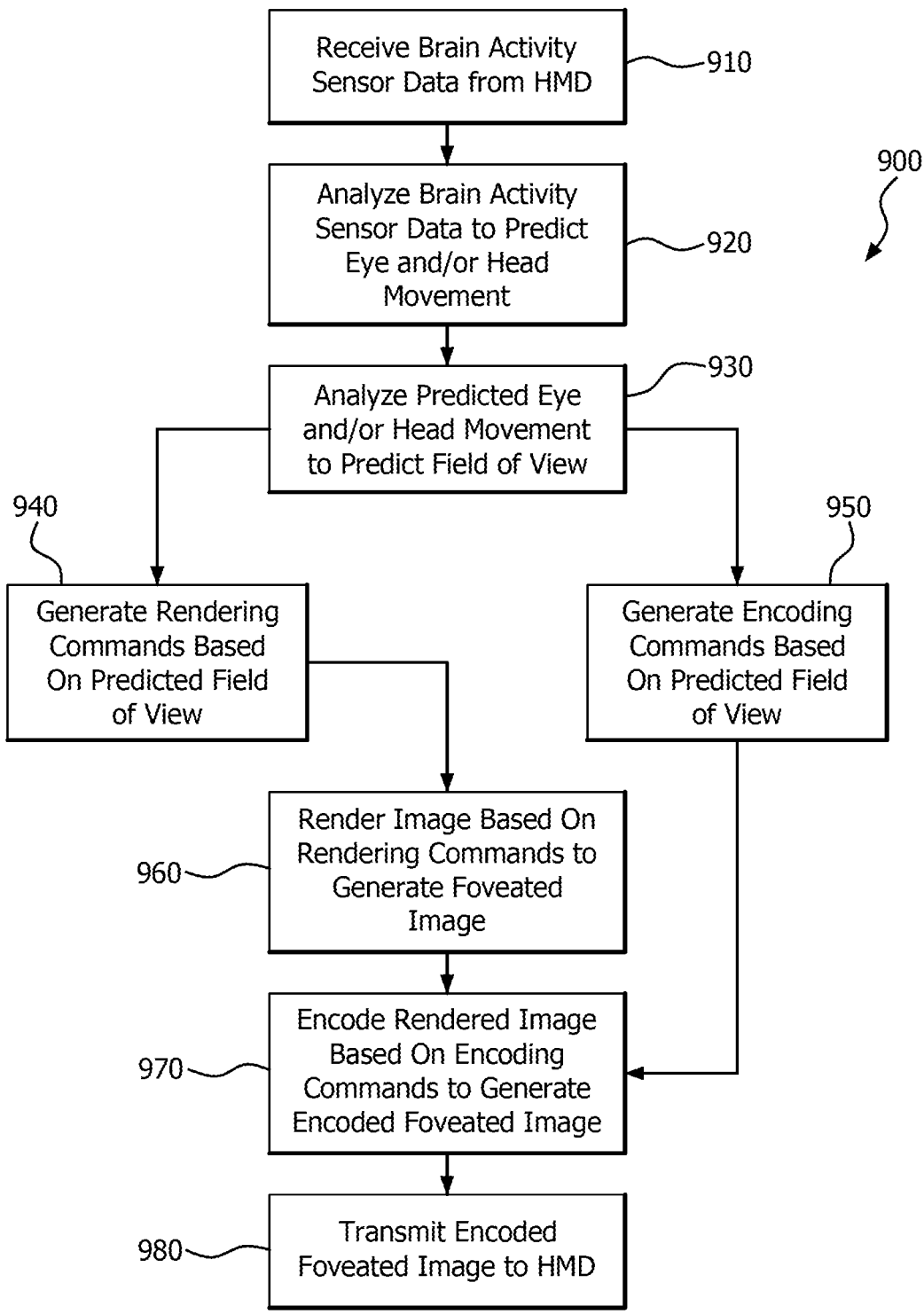
FIG. 9 is a flow chart illustrating an example procedure for generating and transmitting a foveated image based on a predicted field of view of a user.

FIG. 9 is a flow chart illustrating an example procedure 900 for generating and transmitting a foveated image based on a predicted field of view of a user. Procedure 900 is usable, for example, with system 800 described with respect to FIG. 8.

In step 910, a rendering device (e.g., rendering device 810) receives brain activity sensor data from a HMD (e.g., HMD 500).

In step 920, the rendering device analyzes the brain activity sensor data to predict eye and/or head movement of the user. The analysis is performed using a CPU, specialized hardware, or any suitable device. In some implementations, the prediction is performed using an ANN trained to predict the movement based on the brain activity sensor data.

In step 930, the rendering device analyzes the predicted eye and/or head movement to generate a predicted field of view of the user at a future point in time. The analysis is performed using a CPU, specialized hardware, or any suitable device. In some implementations, the analysis is performed using an ANN trained to predict the movement based on the brain activity sensor data. In some implementations, steps 920 and 930 are combinable (e.g., using an ANN trained to infer the predicted field of view directly from the brain activity sensor data).

In step 940, the rendering device generates rendering commands based on the predicted field of view (e.g., using a CPU) and communicates the rendering commands to rendering hardware (e.g., a GPU). In step 950, the rendering device generates encoding commands based on the predicted field of view (e.g., using a GPU) and communicates the encoding commands to encoding hardware (e.g., a video encoder).

In step 960, the rendering device renders an image frame from graphics data (e.g., using a GPU) based on the rendering commands to generate a foveated image frame. The rendered foveated image frame is communicated to the encoding hardware for encoding. In step 970, the encoding device encodes the rendered image frame (e.g., using a video codec) based on the encoding commands to generate an encoded foveated image frame. The encoded foveated image frame is communicated to wireless communications circuitry (e.g., a radio transceiver) and transmitted to the HMD for display to a user.

It is noted that in some implementations, foveated rendering can have the advantage of facilitating more efficient foveated encoding in some cases. For example, in some implementations, rendering peripheral regions at a lower fidelity (e.g., at a lower resolution) limits spatial frequencies in the peripheral regions in some cases. In some implementations, for image regions with lowered spatial frequencies, a suitably lowered encoding bitrate would not further lower the fidelity of the encoding. In contrast, in some implementations, limiting the encoding bitrate would lower the fidelity of regions in a non-foveally rendered scene by removing high spatial frequencies from the visual signal in the bitrate-limited image areas. Coordinated use of foveal rendering and foveal encoding can have the advantage of producing synergistic improvements in some implementations.

Figure 10:
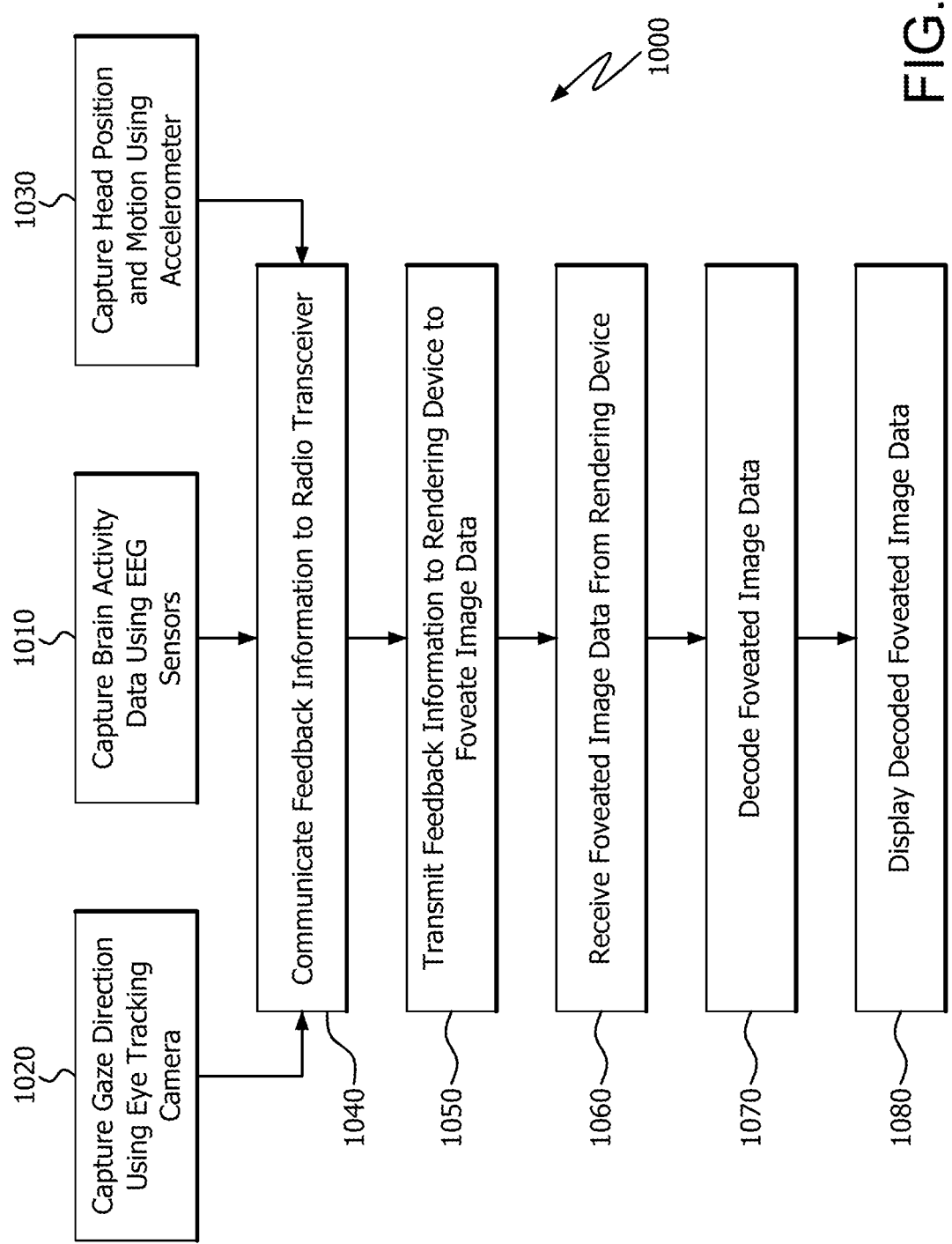
FIG. 10 is a flow chart illustrating an example procedure for receiving and displaying a foveated image based on a predicted field of view of a user.

FIG. 10 is a flow chart illustrating an example procedure 1000 for receiving and displaying a foveated image based on a predicted field of view of a user. Procedure 1000 is usable, for example, with system 800 described with respect to FIG. 8, and procedure 900 described with respect to FIG. 9.

In step 1010, one or more brain activity sensors capture brain activity information with a future position of a field of view of a user of an HMD. In some implementations the brain activity sensors (e.g., EEG sensors) are mounted in the HMD. In step 1020, eye tracking hardware (e.g., an eye gaze sensor) captures the direction of gaze of the HMD user's eye. In step 1030, position and/or orientation tracking hardware (e.g., an accelerometer) captures the position and/or orientation and/or motion of the HMD user's head. In some implementations, steps 1010, 1020, and 1030 occur simultaneously or concurrently. In some implementations, steps 1010, 1020, and 1030 occur independently and are not synchronized in time with one another. The outputs of steps 1010, 1020, and 1030 are communicated to wireless communications circuitry (e.g., a radio transceiver) in step 1040.

In step 1050 the wireless communications circuitry transmits the feedback information to a rendering device (e.g., rendering device 810) for use in generating a foveated image frame. In step 1060 the wireless communications circuitry receives the foveated image frame from the rendering device, decodes the foveated image frame in step 1070, and displays the decoded foveated image frame to the user in step 1080.

It is noted that although the display on which images are being displayed is described and shown as an HMD, in other implementations, other types of display are used, including displays that are not head mounted and/or used for virtual reality.

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a graphics processing unit (GPU), an accelerated processing unit (APU) central processing unit (CPU), a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for generating an image frame for display to a user, the method comprising:
receiving brain activity sensor data correlated with movement of a user;
determining a predicted gaze direction of the user based on the brain activity sensor data;
generating an image frame based on the predicted gaze direction; and
transmitting the image frame to a display.

2. The method of claim 1, wherein generating the predicted gaze direction comprises:
inputting the brain activity sensor data to an artificial neural network (ANN); and
determining the predicted gaze direction of the user using the ANN based on the input brain activity sensor data.

3. The method of claim 1, wherein generating the image frame based on the predicted gaze direction comprises:
determining a predicted field of view of the user based on the gaze direction; and
rendering graphics data to generate the image frame with a first fidelity in an area of the image frame corresponding to a center of the predicted field of view, and with a second fidelity lower than the first fidelity in an area of the image frame not corresponding to the center of the predicted field of view.

4. The method of claim 1, wherein generating the image frame based on the predicted gaze direction comprises:
determining a predicted field of view of the user based on the gaze direction; and
encoding the image frame with a first bit rate in an area of the image frame corresponding to a center of the predicted field of view, and with a second bit rate lower than the first bit rate in an area of the image frame not corresponding to the center of the predicted field of view.

5. The method of claim 1, further comprising receiving eye tracking data correlated with a current gaze direction of the user; and generating the predicted gaze direction based on both the brain activity sensor data and the eye tracking data.

6. The method of claim 1, further comprising receiving information correlated with a position, an orientation, or both the position and orientation of the user; and generating the predicted gaze direction based on both the brain activity sensor data and the information.

7. A device for generating an image frame for display to a user, the device comprising:

receiver circuitry configured to receive brain activity sensor data correlated with movement of a user;

processing circuitry configured to determine a predicted gaze direction of the user based on the brain activity sensor data;

processing circuitry configured to generate an image frame based on the predicted gaze direction; and transmitter circuitry configured to transmit the image frame to a display.

8. The device of claim 7, further comprising:

an artificial neural network (ANN) configured to input the brain activity sensor data and to determine the predicted gaze direction of the user based on the input brain activity sensor data.

9. The device of claim 7, wherein the processing circuitry is further configured to determine a predicted field of view of the user based on the gaze direction; and the device further comprises:

graphics processing circuitry configured to render graphics data to generate the image frame with a first fidelity in an area of the image frame corresponding to a center of the predicted field of view, and with a second fidelity lower than the first fidelity in an area of the image frame not corresponding to the center of the predicted field of view.

10. The device of claim 7, wherein the processing circuitry is further configured to determine a predicted field of view of the user based on the gaze direction; and the device further comprises:

encoder circuitry configured to encode the image frame with a first bit rate in an area of the image frame corresponding to a center of the predicted field of view, and with a second bit rate lower than the first bit rate in an area of the image frame not corresponding to the center of the predicted field of view.

11. The device of claim 7, further comprising:

processing circuitry configured to receive eye tracking data correlated with a current gaze direction of the user; and to generate the predicted gaze direction based on both the brain activity sensor data and the eye tracking data.

12. The device of claim 7, further comprising receiving information correlated with a position, an orientation, or both the position and orientation of the user; and generating the predicted gaze direction based on both the brain activity sensor data and the information.

13. A method for receiving and displaying a foveated image frame based on a predicted gaze direction of a user, the method comprising:

capturing brain activity information of a user;

communicating the brain activity information to a transceiver;

transmitting the brain activity information using the transceiver, to a rendering device to predict a gaze direction based on the brain activity information and to generate a foveated image frame based on the predicted gaze direction of the user;

receiving the foveated image frame from the rendering device;

decoding the foveated image frame; and displaying the foveated image frame to the user.

14. The method of claim 13, wherein the foveated image frame comprises a first fidelity in an area of the image frame corresponding to a center of a predicted field of view generated based on the predicted gaze direction, and a second fidelity lower than the first fidelity in an area of the image frame not corresponding to the center of the predicted field of view.

15. The method of claim 13, wherein the foveated image frame is encoded with a first bit rate in an area of the foveated image frame corresponding to a center of a predicted field of view generated based on the predicted gaze direction, and with a second bit rate lower than the first bit rate in an area of the foveated image frame not corresponding to the center of the predicted field of view.

16. The method of claim 13, further comprising capturing eye tracking information correlated with a current gaze direction of the user; and transmitting the eye tracking information to the rendering device to generate a predicted gaze direction based on the brain activity information and the eye tracking information.

17. The method of claim 13, further comprising capturing information correlated with a position, an orientation, or both the position and orientation of the user; and transmitting the information to the rendering device to generate the predicted gaze direction based on the brain activity information and the information.

18. The method of claim 13, further comprising capturing the brain activity information of the user using an electroencephalography (EEG) sensor.

19. The method of claim 16, further comprising capturing the eye tracking data using a camera mounted in a head-mounted display (HMD).

20. The method of claim 17, further comprising capturing the information using at least one accelerometer.

* * * * *